Oct. 26, 1965   C. H. SCHAAR   3,214,502
METHOD AND APPARATUS FOR MAKING ADHESIVE TAPES
Original Filed Aug. 8, 1960

INVENTOR.
Charles H. Schaar

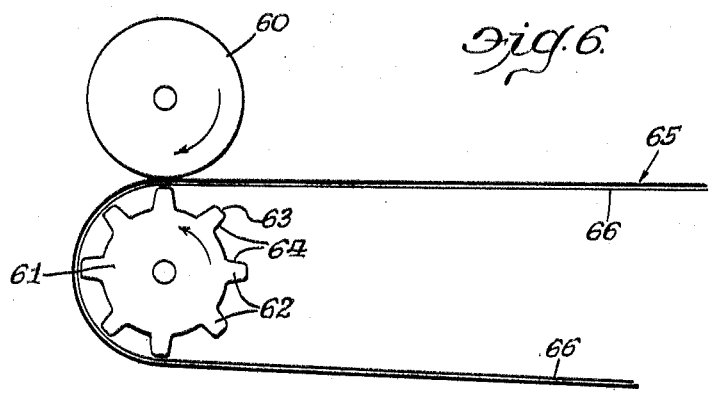
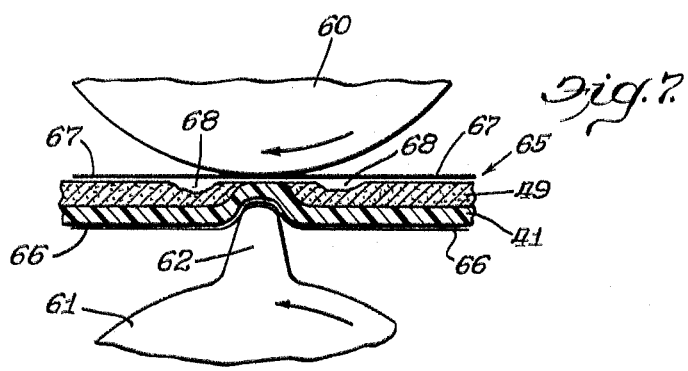
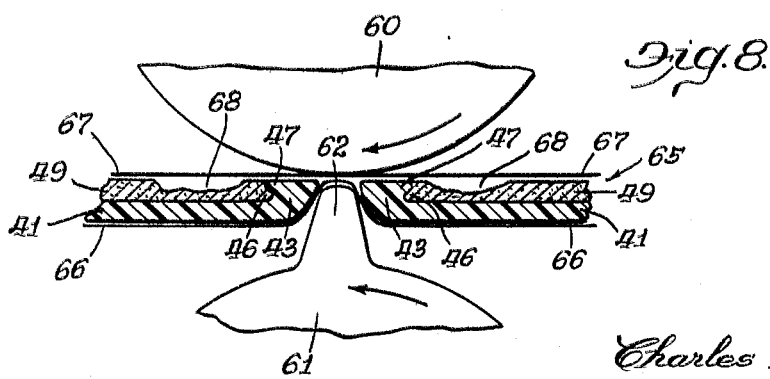

3,214,502
METHOD AND APPARATUS FOR MAKING ADHESIVE TAPES
Charles H. Schaar, Chicago, Ill., assignor to The Kendall Company, Boston, Mass., a corporation of Massachusetts
Original application Aug. 8, 1960, Ser. No. 48,225, now Patent No. 3,073,304, dated Jan. 15, 1963. Divided and this application Jan. 15, 1962, Ser. No. 167,215
13 Claims. (Cl. 264—154)

This application is a division of copending application, Serial No. 48,225, filed on August 8, 1960, now Patent No. 3,073,304.

This invention relates to perforated adhesive tapes and to a method of perforating either the adhesive layer on a tape backing or both the adhesive layer and backing. In particular, this invention relates to perforated thermoplastic polyvinyl pressure-sensitive adhesive tapes suitable for use as surgical and first-aid tape bandages.

Surgical tapes essentially are composed of at least two elements: a backing and a pressure-sensitive adhesive layer thereon. The adhesive layer is normally in direct covering contact with the skin. The covered portion of the skin is thus sealed from the atmosphere, the adhesive layer obstructing the normal evaporation of fluids from the skin surface, resulting, in some cases, in a macerated skin condition. In some instances maceration has been known to become so severe that removal of the tape is associated with painful pulling off of skin, and even portions of the flesh below the skin. Maceration has been a problem not only with tapes having substantially impervious plastic film backings, but also with tapes having a more pervious backing, namely woven fabric or cloth tapes used as surgical or athletic strapping tapes.

In the absence of a satisfactory substitute for the pressure-sensitive tape to bind, or to hold wound dressings to, the body, an obvious means of reducing maceration was to perforate either the adhesive layer or both the adhesive layer and the backing, preferably both in case of impervious backings. Printing or transferring the adhesive in a patterned formation on pervious backings, such as fabrics and microporous films has also been suggested.

Ideally, the tape should have a large open area to provide maximum ventilation or aeration of the skin without substantial sacrifice in the physical properties of the tape and the protective and covering function to be served thereby. For a given open area, maximum ventilation uniformly under the tape may be obtained by a substantially uniform distribution of small holes throughout the tape providing direct open paths exposing the skin to the atmosphere.

Tapes having the open area distributed amongst a large number of small holes provide a better covering function than tapes having the same open area but a lesser number of larger holes. Under conditions of normal exposure, the tape with the smaller openings will maintain a cleaner and neater appearance, thus offering some psychological therapeutic advantage to the wearer in maintaining a cleaner appearing wound site. Preferably, the openings should be no smaller than that equivalent in area to a circular opening having a diameter substantially less than about 10 mils and no larger than about 60 mils. Openings in this size range having substantially straight, non-tortuous paths of communication with the skin and the atmosphere provide adequate exposure for evaporation of moisture from the skin under the perforations.

Pressure-sensitive adhesives exhibit an undersirable tendency to flow. In perforated tapes the adhesive may creep beyond the peripheral edges of the openings, sometimes to the extent of completely obstructing the opening. This tendency may be accelerated at elevated temperatures of steam sterilization, and even at temperatures as low as about 140° F. employed in so-called "chemical" sterilization cycles. Aside from impairing the aerability of the tape, the adhesive on the edge of and in the openings collects dust particles when the bandage is in use and rapidly acquires an unsightly appearance. Bleeding of the adhesive through the openings and to the reverse side of the tape may cause undesirably high unwind and "picking" of the adhesive when the tape is wound in roll form.

Adhesive obstruction of the opening or accumulation of the adhesive at the very edges of the openings is difficult to avoid in known processes of making perforated tapes. Printing of adhesives in a pattern requiring solvent-thinned adhesives must be carefully controlled to avoid strike-through of the adhesive on fabric backings. Transferring prepatterned adhesives onto the matrix of a perforated film without covering the openings therein presents difficult problems of coordinating the feed of the film to the adhesive pattern on the printing roll.

Mere mechanical puncturing of an adhesively coated backing is unsatisfactory. This method forms flaps around the puncture in the backing which may return to their normal position forming a closure. In addition, adhesive fragments may adhere to the puncturing needle and transfer to the reverse side of the tape or the edges of the puncture upon withdrawal thereof. Adherence of adhesive fragments may be minimized or eliminated by heating the needle to a temperature at which the adhesive will be sufficiently flowable to slide from the needle. The heat of the needle may adversely affect the adhesive; in some cases heating of the adhesive may pyrolyze the adhesive and even the film when exposed to the atmosphere.

Die cutting operations employed in perforating plastic film backed tapes reduce the strength properties of the tape by reason of the wasteful removal of material from the tape and also by reason of radial tears produced along the edges of the holes by the cutting operation. The reduction in tensile strength can be tolerated in the area of the backing over an adhesively secured absorbent gauze pad because the pad serves to reinforce this part of the backing. Die-cut perforated tapes usually are limited to the rather large size version of the commercial form of the finger bandage having relatively few number of holes in the tape, less than about 100 per square inch of tape. The adhesive layer of these die-cut perforated tapes extends to the peripheral edges of the openings and may "feather-out" into the openings as explained above.

In general, perforated adhesive tapes of this invention comprise an adhesive layer having openings therein which are in substantial register with openings in a thermoplastic film backing, but which are larger than the openings in the backing so that the edges thereof are recessed from the edges of openings in the backing. More particularly, the openings in the backing are surrounded by annular grommets formed on the adhesively coated side of the tape, the grommets having surface portions thereof substantially flush with a facing sheet on the adhesive side of the tape. The annular grommets retain the body of the adhesive layer from the edges of the openings in the backing, preventing creeping of the adhesive to the edges of the openings and bleed-through into the openings under conditions normally encountered in packaging, sterilizing, storage and use. The perforations in the adhesive layer, the perforations in the thermoplastic film, and the annular grommets are formed by subjecting an imperforate adhesively coated film to heat and pressure in discrete areas to melt the adhesive, causing the adhesive to recede from the area of applied heat and pressure, and to melt the thermoplastic film in the portions from which the adhesive recedes, forming the molten film in raised annular grommets around the film openings. As will be more particularly described, the adhesive layer is perforated while positioned between the backing and a temporary releasable facing sheet. Included within this invention is a process of perforating an adhesive layer on a backing under heat and pressure while protecting the adhesive from oxidative degradation.

The invention will best be understood by a detailed description with reference to the drawings wherein:

FIG. 6 is a schematic drawing of the process of this invention, the apparatus suitable for carrying out this process being diagrammatically illustrated; and FIGS. 7 and 8 are diagrammatic representations of the formation of perforations in adhesive tape.

Figure 1:
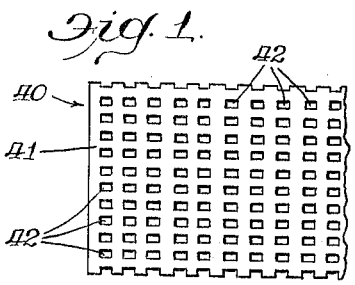
FIGS. 1 and 2 are enlarged diagrammatic planar views of portions of perforated adhesive tapes, viewed from the backing side of the tape.
Figure 2:
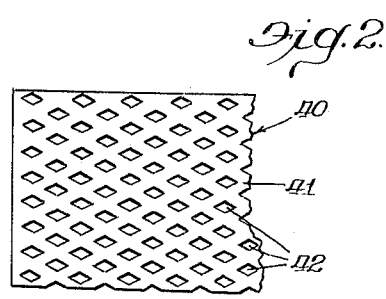

Views of tapes 40 from the backing side are set forth in FIGS. 1 and 2 merely for the purpose of illustrating two shapes of openings among the many shapes which the openings may assume and two of the many patterns in which the openings may be arranged. As shown in FIGS. 1 and 2, a polyvinyl film 41 is perforated with openings 42: substantially rectangular openings in the tape of FIG. 1 and diamond-shaped openings in the tape of FIG. 2. The tapes of FIGS. 1 and 2 also differ from each other in the pattern in which the openings 42 are arranged: the openings 42 arranged substantially in straight rows in which the openings are aligned with each other in both longitudinal and transverse directions of the film 41 in FIG. 1 and in a staggered pattern in FIG. 2. Random patterns of openings and openings of random size may be employed. Uniform patterns of arrangement and size of the openings are to be preferred where substantially uniform distribution of the open area is desirable.

Figure 3:
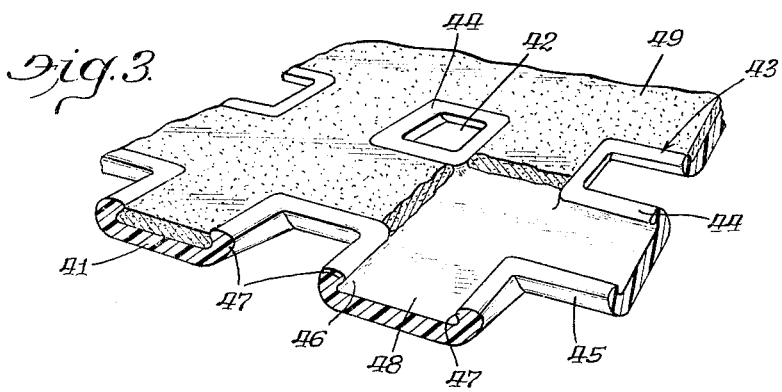
FIG. 3 is a greatly enlarged diagrammatic cross-sectional, partly perspective view of a portion of the adhesive tape shown in FIG. 1, with a portion of the adhesive layer removed, as viewed from the adhesively coated side of the tape.

The structure by which the body of the adhesive is retained from the edges of the perforations is diagrammatically illustrated in FIG. 3 which is a cross-sectional, partly perspective view of a portion of the tape of FIG. 1. When viewed from the adhesive side of the tape, the novel features of this invention are immediately apparent, particularly when the color of the film and adhesive layer are different. For example, in the case of flesh colored polyvinylchloride tapes with a white adhesive coating, flesh colored portions of the film corresponding to the surface designated by the numeral 44 in FIG. 2 are apparent as distinct "halos" around each opening 42.

The annular grommets 43 are formed from the film material previously occupying the space represented by the opening 42 in the film 41. Each of the openings 42 is surrounded by a grommet formation 43, comprising an interior wall 45, the surface 44, and an exterior wall 46. As viewed in FIG. 3, the interior wall 45 extends above the plane of the portions 48 of the matrix of the film coated with the pressure-sensitive adhesive layer 49 and terminates in the substantially horizontal planar surface 44 forming an inner peripheral edge defining the perforation on the adhesive side of the film 41. The surface 44 terminates along an outer peripheral edge 47 spaced from said inner peripheral edge in the exterior wall 46 which extends downwardly, as viewed in FIG. 2, to the coated matrix portion 48 and merging therewith. As formed in the process to be described, the face of the grommet 43 represented by the surface 44 is substantially planar and substantially coplanar with the plane of the portion of the adhesive layer immediately surrounding the grommets.

The outer peripheral edge 47 slightly overhangs the exterior wall 46 functioning as a retaining lip or rim for the adhesive layer 49.

The adhesive layer 49 extends into direct abutment with the exterior walls 46. These walls serve to retain the adhesive in position away from the peripheral edge of the opening 42 and protectively cover the peripheral surface of the edges of the adhesive layer around the grommets. The overhanging lip or rim at the outer peripheral edge 47 not only helps to prevent adhesive creep but also helps to prevent delamination of the adhesive when stripping releasable facing sheets from the adhesive layer.

Figure 4:
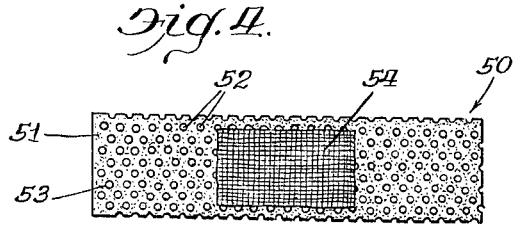
FIG. 4 is a diagrammatic planar view of an adhesive tape bandage made in accordance with this invention.

FIG. 4 illustrates a finger-type adhesive bandage 50 wherein an absorbent pad 54 is positioned substantially medially on a perforated tape of this invention secured to the adhesive layer 51. The circular openings 52 are surrounded by the grommets 53 (shown by heavy lines in FIG. 4) extending through the adhesive layer.

Figure 5:
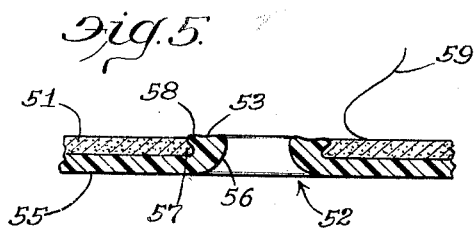
FIG. 5 is a cross-sectional view of a portion of the adhesive tape of FIG. 4, showing a protective facing sheet being stripped therefrom.

In accordance with the requirements of the U.S. Pharmacopeia bandages of the type shown in FIG. 4 must be faced with a protective facing sheet and sterilized. FIG. 5 illustrates in detail, exaggerated for purposes of clarity, the adhesive retention advantage of the grommets and in particular grommets having a retaining rim at the outer peripheral edge thereof. Referring to FIG. 5, the opening 52 in the backing 55 is surrounded by the interior wall 56 of the grommet. The adhesive layer 51 extends into abutment with the exterior wall 57 and up to the jutting rim forming the outer peripheral edge 58. The numeral 59 designates a facing sheet in the process of being stripped from the adhesive layer 51 as it is passing over and past the outer peripheral edge 58. The adhesive layer is in adherent contact not only with the matrix portions of the film but also with the substantially vertical exterior wall 57 and the overhanging rim at edge 58. Delamination by splitting of the adhesive layer beginning at the edges of the perforations is resisted by the adhesive forces at these portions of the film and grommets.

In the case of polyvinylchloride films the surface 53 of the grommet may be slightly irregular after sterilization and not as flat as prior to sterilization. The edges of the grommet however remain substantially flush with the surface of the adhesive layer 51.

Perforated thermoplastic film backed pressure-sensitive adhesive tapes have been made in accordance with this invention by the process schematically illustrated in FIG. 6. In this process a faced tape is subjected to pressure in discrete areas thereof pressing the faced tape from the film side against a heated surface. Under the conditions of heat and pressure the adhesive layer and film melt or are rendered flowable and recede from the areas of applied pressure thereby producing openings therein.

Referring specifically to FIG. 6, the numeral 60 designates a smooth metal roll, heated in any appropriate manner. Roll 61 is a knurled metal roll, the surface of which contains raised protuberances or bosses 62. The surface 63 of each of the bosses 62 is substantially flat and may have a configuration corresponding to the shape of the openings desired. The numeral 64 designates the walls of the bosses 62. Rolls 60 and 61 are positioned with respect to each other to subject a tape passing through the nip between the rolls to pressure. Roll 61 is driven and roll 60 is rotatable, rotating by frictional engagement with the faced tape 65 passing through the nip. The direction of rotation is indicated by the arrows.

The faced tape 65 is placed upon a back-up sheet 66 with the film backing against the back-up sheet. The tape 65 and back-up sheet 66 are introduced into the nip between the rolls 60 and 61. The composite of the backing 66 and faced tape 65 are momentarily subjected to heat and pressure in discrete areas between the surface of the roll 60 and the surfaces 63 of the bosses 62. Depending upon the conditions employed, either the adhesive layer alone can be perforated in these discrete areas of applied pressure or both the adhesive layer and thermoplastic film backing can be perforated.

Reference to FIGS. 7 and 8 illustrates diagrammatically the formation of the perforations in the tapes shown in FIGS. 1–3 at the nip between rolls 60 and 61. The faced adhesive tape generally designated by the numeral 65 comprises a thermoplastic film 41, for example, a polyvinylchloride film, coated with a pressure-sensitive adhesive layer 49. The adhesive layer 49 is covered with a thin facing sheet 67, for example, cellophane film. A back-up sheet 66, for example, ordinary newsprint paper sheet, is placed against the polyvinyl film.

As the boss 62 engages the composite of the faced tape 65 and the back-up sheet 66, the cellophane facing 67 is pressed against the surface of the roll 60. The adhesive layer directly underneath the facing sheet, as viewed in FIG. 7, is melted and flows laterally between the film 41 and the cellophane facing sheet 67 radially away from the areas subjected to pressure between the roll 60 and the boss 62. Under continued pressure the film 41 is projected into the space created by the melted and recessed adhesive, the outer surface of that portion of the film turning in toward the adhesive layer to form the surface of an embossed depression in the film. As schematically illustrated at this stage in FIG. 7, only the adhesive layer is perforated, the opening therein corresponding in general to the configuration of the surface of the boss 62.

Under sufficient pressure forcing rolls 60 and 61 toward each other projected portions of the film are heated against the surface of the cellophane facing sheet to a molten state causing the molten film to shift laterally between the facing sheet 67 and back-up sheet 66. As shown in FIG. 8 the molten projected film portion is displaced from the area of applied pressure and is accumulated in a solidified annular grommet 43 formed on the adhesive side of the tape with the external walls 46 and the jutting peripheral edge 47 abutting the adhesive layer, as previously described in reference to FIG. 3.

Depressions 68 in the adhesive layer 49 may occur, as shown in FIGS. 7 and 8, outlining what appears to be adhesive grommets or annular rings around the annular film grommets 43. The adhesive layer immediately adjacent to the grommets and the face of the grommets 43 are in flush contact with the facing sheet 67. These depressions may disappear upon heating at about 140° F. during chemical sterilization of the faced tape. Apparently when heated the adhesive layer becomes sufficiently flowable to level out, the adhesive generally conforming to the surface of the facing sheet. These depressions do not always occur in the adhesive.

During the perforation step under applied pressure and heat the molten portion of the adhesive layer is protected against exposure to the atmosphere by the imperforate facing sheet 67. The facing sheet also acts as a molding surface, supported by the roll 60, against which the adhesive and film may be displaced radially from the zones of applied pressure and heat. The facing sheet must be substantially dimensionally stable when subjected to the pressure and heat. The facing sheet must be strippable from the adhesive layer. Wettable cellophane film is satisfactory as a facing sheet and can withstand temperatures as high as about 560° F. which may be employed in the process of perforating polyvinyl film pressure-sensitive adhesive tapes.

The temperature of the heated smooth roll 60 and the pressure between the roll 60 and the roll 61 depends upon the tape composition, the rate at which the tape passes between the rolls which determines dwell time of the applied pressure and temperature, the thermal conductivity of the facing sheet, and the thermal conductivity of the bosses 62 or the bosses 62 covered by a back-up sheet. As to tape composition, pressure-sensitive adhesives are soft, semi-solid materials at ordinary room temperatures. The application of pressure alone can force the adhesive to shift away from the area of applied pressure. The rate at which the adhesive is displaced is accelerated at elevated temperatures. Accordingly, only moderate temperatures and pressures need be employed if perforation of the adhesive layer alone is desired on either film or fabric backings.

Interestingly, temperatures and pressures sufficient to perforate both a polyvinyl film and an adhesive layer of a faced tape, when passed through the nip between the metal rolls 60 and 61 with a back-up sheet as described in reference to FIGS. 6–8, were insufficient to perforate the film backing when the back-up sheet was eliminated. Increasing the pressure between the two rolls resulted in thinning of the projected film portion coincident with the opening in the adhesive layer. An occasional few of these veil-like thinned projected film portions were ruptured. Still eliminating the back-up sheet, the polyvinyl film tended to deform and shrink when the roll 61 was heated to the melting point of the film.

Based on these observations it was discovered that concentration of the transmission of heat from the smooth roll 60 in the portions of the tape subjected to pressure without dissipation of the heat by conductance through the metal bosses of the roll 61 produced the perforations illustrated in the drawings. The use of a back-up sheet providing thermal insulation for the metal bosses is a convenient way of avoiding heat dissipation from the tape and also avoiding unduly high temperatures for roll 61. Satisfactory results may be obtained by thermally insulating the metal bosses by a coating of low thermally conductive material, such as oils, greases, and resins. Alternatively, the knurled roll 61 may be made of hard, non-thermoplastic resins having a thermal conductivity less than that of steel. Metal rolls generally may be preferred because of their greater resistance to wear. Dissipation of heat may also be minimized by reducing the temperature differential between the heated roll 60 and the knurled roll 61 by heating the knurled roll to a temperature below that at which the film will deform as it is passed between the rolls.

These principles of the process which produces the perforated tapes of this invention will be illustrated in the following specific examples.

*Example 1*

A thermoplastic film about 0.002" thick comprising polyvinylchloride suitably plasticized with a mixture of a sebacic acid polyester and epoxidized soybean oil and containing minor amounts of conventional light and heat stabilizers, fillers, and pigments to impart a flesh color thereto, was coated with the following pressure-sensitive adhesive from a heptane solution thereof:

| Ingredients: | Parts by weight |
|---|---|
| Pale crepe rubber | 76.5 |
| Tackifier resins | 78.0 |
| Fillers | 70.8 |
| Age resistors | 1.6 |

The tackifier resins were a blend of a glycerol ester of hydrogenated rosin, dimerized abietic acid and pentaerythritol ester of hydrogenated rosin. The age resistors were a mixture of polymerized trimethyl dihydroquinoline, diorthotolyethylene diamine and a condensation product of acetone and aniline. The plasticized polyvinylchloride film had a softening point within the range of about 320°

F. to 345° F. The pressure-sensitive adhesive layer was about 0.0021" thick.

The adhesive layer was faced with a wettable cellophane sheet about 0.001" thick. The cellophane faced tape about three inches wide was placed on a back-up sheet about 0.001" to 0.002" thick with the polyvinyl backing against the back-up sheet. This composite of back-up sheet, tape and facing sheet was introduced into the nip between a smooth metal roll and knurled metal roll in the manner described with reference to FIGURE 6.

Both the smooth and knurled metal rolls were about 4 inches long, each having a diameter about 2 inches. The smooth roll was heated internally by an electrical cartridge heater to a surface temperature of about 420° F.

The surface of the other roll was knurled to give four-sided projections or bosses about 0.017" high, the top surface of each boss having a parallelogram configuration measuring about 0.025" by 0.015." The bosses were arranged in a staggered pattern. There were about 196 bosses per square inch of roll surface.

The pressure between the smooth heated roll and the knurled roll was about 30 pounds per inch of roll length. The knurled roll was driven by an electric motor, at a speed which drew the back-up sheet, tape and facing sheet through the nip at about 6.6 feet per mniute. The smooth roll rotated in frictional engagement with the cellophane facing sheet.

Under these conditions the tape was perforated with generally diamond-shaped openings with the openings arranged in a staggered pattern in the manner shown in FIG. 2. The paper back-up sheet was embossed with the diamond pattern. The cellophane facing was substantially smooth and not perforated. The perforations in the vinyl film were surrounded by annular grommets formed on the adhesive side of the film. The face of each grommet was substantially flush with the plane of the surface of the adhesive layer immediately adjacent the grommets. The perforations in adhesive layer were larger than the perforations in the film. Viewed from the reverse side of the tape, the portions of the film along the edges of the openings were neatly turned inwardly toward the adhesive layer providing a straight non-tortuous path or channel, free of adhesive and ragged film fragments, directly from the film side of the tape to the adhesive side of the tape. The inner walls of the opening corresponding to the inner walls 45 and inner walls 56 shown in FIGS. 3 and 5 tapered slightly toward the adhesive side of the tape.

Perforated tapes having generally rectangular openings were produced by means of a knurled roll wherein the surfaces of the bosses were rectangular, measuring about 0.0025" by 0.0135." The projections were about 0.017" high.

*Example 2*

The same tape of Example 1, faced with the wettable cellophane, was placed upon a back-up sheet of high density polyethylene. The back-up sheet was about 0.002" thick. This composite was introduced into the nip of the smooth roll and the knurled roll described in Example 1, the cellophane facing sheet being placed against the smooth roll. The composite of tape, back-up and facing sheets passed through the nip at about 9 feet per minute under pressure of about 30 pounds per inch of roll length at the nip. At the start of the perforating run the surface temperature of the smooth roll was about 470° F. and the surface temperature of the bosses was room temperature. At the end of about a 100 yard run the surface temperature of the smooth roll was about 445° F. and the temperature of the bosses was about 170° F. Neither the back-up sheet nor the facing sheet was perforated, although the back-up sheet was embossed in the pattern of the knurled roll. Both the film and the adhesive of the tape were perforated. The structure of the tape was the same as described in the previous example and as explained with reference to the drawings.

*Example 3*

The same tape of Example 1, faced with wettable cellophane but without a back-up sheet was fed into the nip between the two rolls, with the cellophane facing toward the smooth roll. The pressure at the nip and the rate of feed were the same as in Example 2. The tempertaure of the smooth roll was about 475° F. and the temperature of the knurled roll was at room temperature at the beginning of the run. In the absence of a back-up sheet only the adhesive layer was perforated. The polyvinyl backing was embossed with the impression of the surfaces of the bosses. The portion of the film projected into the opening substantially flush with the surface of the adhesive was thinner than the matrix of the film.

*Example 4*

A white thermoplastic film, about 0.0045" thick, comprising a copolymer of vinyl chloride (95%) and vinyl acetate (5%) suitably plasticized with a mixture of epoxidized soybean oil and a polyester of adipic acid and 2-ethyl-1,3-hexanediol and containing titanium dioxide filler were coated with a 0.0017" thick layer of a pressure-sensitive adhesive having the following composition:

| Ingredients: | Parts by weight |
| --- | --- |
| Butadiene-styrene rubber (GRS–1022) | 56 |
| Pale crepe rubber | 16 |
| Tackifier resins | 64 |
| Plasticizers | 4 to 5 |
| Age resistors | 4 to 5 |
| Fillers | 13 |

The tackifier resins consisted of a blend of a polyterpene resin and glycerol ester of hydrogenated rosins. The plasticizers consisted of a mixture of synthetic beeswax, epoxidized soybean oil and a polyester of adipic acid and 2-ethyl-1,3-hexanediol. The fillers consisted of a mixture of carbon black and finely divided silica. The age resistor mixture included polymerized trimethyl hydroquinoline, hydrocarbon substituted diaryl amines, and alkylated polyhydroxy phenol.

The adhesive layer was faced with a wettable cellophane sheet about 0.001" thick and a high density polyethylene film about 0.002" thick was placed on the film backing. This composite was introduced into the nip of the two rolls described in Example 1. The smooth roll was heated to a temperature of 450° F. After a period of operation the surfaces of the bosses were 110° F. Both the adhesive and the film were perforated at a pressure of 35 pounds and a speed of about 10.5 feet per minute at the stated temperature and pressure. The grommet surfaces of the white film flush against the cellophane facing sheet were distinctly apparent, contrasting with the black adhesive layer which abutted against the outer walls of the grommets.

*Example 5*

A 0.001" thick polyethyleneterephthlate film coated with a 0.0013" thick layer of the adhesive of Example 4 and faced with wettable cellophane film was placed upon a 0.002" thick high density polyethylene back-up sheet and inserted in the nip between the smooth and knurled rolls as described in Example 1. The temperatures of these two rolls were, respectively, 520° F. and 125° F. and rotated at a linear speed of about 9 feet per minute at a pressure of about 50 pounds. The adhesive was recessed from the perforations in the film and abutted against the walls of the film grommet. The surface of the film grommet was flush against the cellophane facing sheet.

*Example 6*

A preshrunk flesh-tinted, plasticized thermoplastic film comprising a copolymer of vinylidene chloride and vinyl chloride, about 0.002" thick, was coated with a layer of adhesive having the same composition as the adhesive of Example 1. The adhesive layer was about 0.0018" thick.

The adhesive layer was faced with the wettable cellophane. Two strips of this faced tape were placed together, the bottom strip with the cellophane facing placed against the film backing of the top strip. The bottom strip of faced tape served as the back-up sheet.

The superimposed strips were introduced into the nip of the two rolls described in Example 1, with the cellophane facing sheet of the top strip toward the surface of the heated smooth roll. The smooth roll was heated to a temperature of about 420° F. After a period of operation, the temperature of the surfaces of the bosses was about 120° F. The pressure between the two rolls was about 30 pounds per inch length of the rolls. The two strips of faced tape were fed through the rolls at a speed of about 8 feet per minute. The two strips were separated from each other. Both the adhesive layer and the film backing of the top strip of tape were perforated. The surfaces of the grommets were flush with the cellophane facing sheet. The openings in the adhesive were larger than the openings in the film backing, the adhesive layer abutting against the aforedescribed exterior wall of the film grommets.

The adhesive layer of the strip of tape serving as the back-up sheet was perforated; the vinyl film of this strip of tape was embossed in the areas of the openings of the adhesive layer.

*Example 7*

A 0.002″ thick high density polyethylene film was coated with a 0.0017″ thick layer of the adhesive described in Example 4. The adhesive layer was faced with the wettable cellophane. Two superimposed strips of this faced tape were introduced into the nip of the two rolls as described in Example 5. The temperatures of the smooth roll and the surfaces of the bosses were, respectively, about 460° F. and about 160° F. The pressure between the two rolls was about 30 pounds. The superimposed strips of faced tape were fed through the rolls at a linear speed of about 9 feet per minute. Both the adhesive layer and the film backing of top strip of tape were perforated. The surfaces of the grommets were flush with the cellophane facing sheet. The openings in the adhesive were larger than the openings in the film backing, the adhesive layer abutting against the aforedescribed exterior wall of the grommets.

The adhesive layer of the strip of faced tape serving as the back-up sheet was perforated; the polyethylene film of this strip of tape was embossed in the areas of the openings of the adhesive layer.

A series of other examples were run substituting a variety of materials for the back-up sheets of the foregoing examples. Materials which performed satisfactorily in sheet form as substitute back-up sheets are cellophane, glassine paper, non-woven fabric, woven fabrics, urethane foam rubber, soft rubber, and low density polyethylene. Coating the metal surfaces of the bosses with oils and grease resulted in perforation of both the film backing and the adhesive layer. Of all the materials tried, high density polyethylene sheeting on the order of about 1.1 mil thickness is preferred as a material which will help produce openings of the kind described in the tape of Example 1. Under the conditions employed a second strip of tape as the back-up sheet was preferred for the tapes of Examples 5 and 6. The back-up sheeting employed must be flexible and comformable to the configuration of the projections or bosses, such as on the knurled roll.

For the purpose of specifically illustrating the interdependence of temperature, pressure and dwell time, the following examples are set forth. The tapes in these examples were the same as the tape of Example 1. Wettable cellophane was employed as the facing sheet and 0.0015″ thick high density polyethylene was used as the back-up sheet. The initial and final surface temperatures of the rolls are set forth. The pressures given are pressures per inch length of rolls at the nip.

*Example 8*

| Roll | Temperature, ° F. | |
|---|---|---|
| | Initial | Final |
| Smooth Roll | 320 | 270 |
| Knurled Roll | 40 | 65 |

Openings were formed in the adhesive; the vinyl film was embossed but not perforated at pressures as high as 45 pounds at a rate of speed of 9 to 10 feet per minute.

*Example 9*

| Roll | Temperature, ° F. | |
|---|---|---|
| | Initial | Final |
| Smooth Roll | 360 | 340 |
| Knurled Roll | 50 | 65 |

The adhesive layer was perforated and the film was embossed as in Example 8, at pressures of 40 pounds and a speed of about 10 feet per minute.

*Example 10*

| Roll | Temperature, ° F. | |
|---|---|---|
| | Initial | Final |
| Smooth Roll | 410 | 400 |
| Knurled Roll | 60 | 80 |

Speed and pressure were the same as in Example 8; adhesive layer was perforated and vinyl backing was embossed but not perforated.

*Example 11*

| Roll | Temperature, ° F. | |
|---|---|---|
| | Initial | Final |
| Smooth Roll | 450 | 440 |
| Knurled Roll | 50 | 90 |

Same speed and pressure as Example 8; adhesive layer perforated; portion of film projected into opening of adhesive layer was very thin, veil-like. Some of the veils were ruptured, forming a ragged edge opening.

*Example 12*

| Roll | Temperature, ° F. | |
|---|---|---|
| | Initial | Final |
| Smooth Roll | 500 | 470 |
| Knurled Roll | 50 | 90 |

At a pressure of about 25 pounds and a rate of feed of about 10.5 feet per minute, the perforations in the adhesive layer were partly blocked by ruptured veil-like thin portions of the film. At 35 pounds pressure and the same speed the openings were substantially clear of film; at 45 pounds pressure and about 10 feet per minute the perforations in the vinyl film were smooth-edged.

Example 13

| Roll | Temperature, ° F. | |
|---|---|---|
| | Initial | Final |
| Smooth Roll | 500 | 470 |
| Knurled Roll | 100 | 110 |

At 20 pounds pressure and a speed of about 10.5 feet per minute thin, veil-like fragments of film obstructed the perforations; at 30 pounds pressure and a speed of about 10.5 feet per minute a perforated structure as described with reference to the drawings was obtained, the perforations being free of adhesive and film fragments.

Example 14

| Roll | Temperature, ° F. | |
|---|---|---|
| | Initial | Final |
| Smooth Roll | 560 | 540 |
| Knurled Roll | 215 | 215 |

At 5 pounds pressure and speed of about 11.5 feet per minute thin, veil-like ruptured portions of the film remained attached to the inner edge of the grommets in this film. These veil-like portions were substantially melted and displaced into grommet formations at about 10 pounds pressure and at a speed of about 11.5 feet per second.

Example 15

| Roll | Temperature, ° F. | |
|---|---|---|
| | Initial | Final |
| Smooth Roll | 475 | 465 |
| Knurled Roll | 225 | 225 |

At a pressure of 5 pounds and a speed of about 11.5 feet per minute thin, veil-like ruptured portions of the film remained attached to the inner edge of the grommets. At 15 pounds pressure and substantially the same dwell time distinct well defined openings in the film were formed in accordance with this invention.

Example 16

| Roll | Temperature, ° F. | |
|---|---|---|
| | Initial | Final |
| Smooth Roll | 310 | 290 |
| Knurled Roll | 210 | 200 |

At 45 pounds pressure and a dwell time corresponding to about 10 feet per minute the film did not become perforated. The projected film portion appeared very thin and veil-like. A few of these veil-like portions of the film were ruptured.

Example 17

| Roll | Temperature, ° F. | |
|---|---|---|
| | Initial | Final |
| Smooth Roll | 350 | 340 |
| Knurled Roll | 210 | 210 |

Ruptured thin, veil-like portions of the film remained attached to the inner edge of the grommets in the film forming ragged and irregular openings at 10 pounds pressure and about 11.5 feet per minute. Completely open perforations of the structure described in accordance with this invention were obtained at about 15 to 20 pounds pressure and speed of about 10.5 to 11.5 feet per second.

The heat necessary for melting or rendering the adhesive mass and film flowable is supplied by the smooth surface of the heated smooth roll. The knurled roll becomes heated by conductance of heat from the smooth roll during the process; however, the temperature of the knurled roll does not exceed the temperature which heats adjacent matrix portions of the film backing to a temperature which causes deformation or distortion throughout the tap. The maximum operable temperature of the knurled roll and temperature of the smooth roll depends upon the composition and thickness of the tape, facing sheet, back-up sheet, pressure, dwell time and may also be influenced by the size and design of the apparatus.

For the apparatus described specifically in Example 1 structures in accordance with this invention are obtained at smooth roll temperatures in the range of about 300° F. to about 560° F. and, correspondingly, knurled roll temperatures not exceeding about 240° F. at a pressure of about 5 pounds and not less than about 90° F. at a pressure of about 45 pounds, at dwell times at the nip corresponding to about a rate of feed at the nip of between 6 to 12 feet per minute. Preferably, the conditions should be chosen so as to operate at the lowest temperatures, pressures and dwell times possible. In all circumstances, however, the smooth surface must be hotter than the projections or bosses to produce the perforated tape structure of this invention since the described grommets in the thermoplastic films form toward the hotter surface.

Perforated tapes made in accordance with this invention were made into adhesive bandages of the type described in the U.S. Pharmacopeia. The cellophane faced perforated tape was first soaked in water to wet the cellophane, the wetted cellophane being easily removable from the adhesive layer. An absorbent pad was placed on ¾" by 3" strips of the perforated tape. The exposed adhesive was faced with polyethylene facing sheets, the sheets also covering the pad. The bandages were packaged in individual paper envelopes of the type described in U.S. Patent 2,924,331 and sterilized. Maceration and discloration of the skin were substantially less for these perforated tapes than for commercially available film backed adhesive tapes.

From the foregoing it is apparent that a back-up sheet may be omitted in perforating only the adhesive layer of tapes employing non-thermoplastic backings, such as fabric backings. A facing sheet, however, serves to prevent oxidative degradation of the adhesive at the elevated temperatures employed in the perforation process. The adhesive layer of cloth tapes, faced with a facing sheet, may also be perforated in the following described process.

Perforated tapes have also been produced with a knurled roll and smooth roll similar to that illustrated in FIG. 6, while protecting the adhesive layer against oxidative influences of atmosphere, except that in this instance the knurled roll was heated to about 470° F. and the composite of tape, facing and back-up sheets were fed into the nip between the two rolls with the faced adhesive side of the tape facing the heated projections of the knurled roll. The tape was the same as described in Example 1. The back-up sheet, 0.002" high density polyethylene film, was in contact with the smooth roll. Initially the smooth roll was at room temperature. During the run the smooth roll became heated to about 170° F. by transmission of heat from the heated projections. At a pressure of about 35 pounds and a speed of about 8 feet per minute, both the adhesive layer and the polyvinylchloride film were perforated. The film grommets which formed were substantially underneath the adhesive layer at the edges of the openings. The walls of the film grommet terminated in a narrow ridge formation. Since these ridges were formed underneath the adhesive layer they were not flush with the cellophane facing sheet. The openings in the adhesive were slightly larger than the openings in the film backing. The wall of the film surrounding the opening tapered from the ridges to a smaller opening at the surface of the film against which the back-up sheet was placed. Neither the cellophane facing sheet nor the polyethylene back-up sheet were perforated.

What is claimed is:

1. The method of perforating the adhesive layer of an adhesive tape, said tape comprising a flexible backing and a coating of a pressure-sensitive adhesive layer, said adhesive layer faced with a releasable facing sheet, comprising: subjecting portions of said adhesive layer to heat and pressure rendering the adhesive portions flowable between said backing and facing sheet at the areas of applied pressure and displacing the flowable portions of the adhesive laterally between said backing and said facing sheet radially from the areas of applied pressure; and accumulating said portions of the adhesive in the layer around the areas of applied pressure.

2. The method of perforating an adhesive tape, said tape comprising a thermoplastic film backing and a coating of a pressure-sensitive adhesive layer, said adhesive layer faced with a releasable facing sheet, comprising: subjecting discrete areas of said adhesive tape to heat and pressure rendering the adhesive portions flowable between said backing and facing sheet at said discrete areas of applied pressure and displacing the flowable portions of the adhesive laterally between said backing and said facing sheet radially from the areas of applied pressure to form openings in said layer; accumulating said molten portions of the adhesive in the layer around the areas of applied pressure; projecting the portions of the backing coincident with said areas into the openings created by the displaced adhesive portions against the facing sheet under applied pressure; continuing application of heat and pressure rendering the projected film portions flowable against the facing sheet and displacing the film portions laterally against the surface of the facing sheet radially from said areas of applied pressure to form openings in said film coincident with the openings in the adhesive layer; and accumulating the flowable displaced film portions in a thickened grommet formation around each of said discrete areas in direct side-by-side abutment with said adhesive layer.

3. The method of perforating the adhesive layer of an adhesive tape, said tape comprising a flexible backing and a coating of a pressure-sensitive adhesive layer, said adhesive layer faced with a releasable facing sheet, comprising: heating portions of said adhesive layer to a molten state at discrete areas under applied pressure between said backing and said facing sheet; displacing the molten portions of the adhesive laterally between said backing and said facing sheet radially from the areas of applied pressure; and accumulating said molten portions of the adhesive in the layer around the areas of applied pressure.

4. The method of perforating an adhesive tape, said tape comprising thermoplastic film backing and a coating of a pressure-sensitive adhesive layer, said adhesive layer faced with a releasable facing sheet, comprising the steps of: heating portions of said adhesive layer to a molten state at discrete areas under applied pressure between said backing and facing sheet; displacing the molten portions of the adhesive laterally between said backing and said facing sheet radially from the areas of applied pressure to form openings in said layer; accumulating said molten portions of the adhesive in the layer around the areas of applied pressure; projecting the portions of said backing coincident with said areas into the openings created by the displaced adhesive portions against the facing sheet under applied pressure; heating the projected film portions to a molten state at said areas under applied pressure; displacing said molten film portions laterally against the surface of the facing sheet radially from said areas of applied pressure to form openings in said film, and accumulating the molten displaced film portions in a thickened grommet formation around each of said areas of applied pressure in direct side-by-side abutment with said adhesive layer.

5. The method of perforating an adhesive tape, said tape comprising a thermoplastic film backing and a coating of a pressure-sensitive adhesive layer, said adhesive layer faced with a releasable facing sheet, comprising: subjecting discrete areas of said adhesive tape to heat and pressure rendering the adhesive portions flowable between said backing and facing sheet at said discrete areas of applied pressure and displacing the flowable portions of the adhesive laterally between said backing and said facing sheet radially from the areas of applied pressure to form openings in said layer; accumulating said flowable portions of the adhesive in the layer around the areas of applied pressure; continuing application of heat and pressure rendering the film portions flowable at said dicrete areas and displacing said film portions radially from said areas of applied pressure to form openings in said film coincident with the openings in the adhesive layer; and accumulating the displaced film portions in a thickened grommet formation around each of said discrete areas.

6. The method of claim 5 wherein said tape is interposed between said facing sheet in contact with the adhesive layer and a flexible back-up sheet against said film backing while being subjected to said heat and pressure.

7. The method of perforating the adhesive layer of an adhesive tape, said tape comprising a flexible backing and a pressure-sensitive adhesive layer thereon, said adhesive layer faced with a releasable facing sheet, comprising the steps of: passing the faced tape through a nip between a heated smooth surface and projections having end surfaces facing said smooth surface, said tape positioned in said nip with the facing sheet in contact with said smooth surface; applying pressure to discrete areas of said tape corresponding to the end surfaces of said projections by compressing the tape at the nip between said smooth surface and said end surfaces; melting the portions of said adhesive layer at said discrete areas under pressure by conductance of heat thereto from said heated smooth surface; and displacing the molten portions of adhesive layer laterally between said facing and backing radially from said discrete areas by the continued application of pressure to form performations in said adhesive layer.

8. The method of perforating an adhesive tape, said tape comprising a thermoplastic film backing and a coating of a pressure-sensitive layer thereon, said adhesive layer faced with a releasable facing sheet, comprising the steps of: passing the faced tape into a nip between a heated smooth surface and projections having end surfaces facing said smooth surface, said tape positioned in said nip with the facing sheet in contact with said smooth surface; applying pressure to discrete areas of said tape corresponding to the end surfaces of said projections by compressing the tape at the nip between said smooth surface and said end surfaces; melting the portions of said adhesive layer and backing at said discrete areas by conductance of heat thereto from said heated smooth surface; and displacing the molten portions of said adhesive layer and backing laterally along the plane of said facing sheet radially from said discrete areas by continuing the application of pressure thereto to form perforations in said adhesive layer and said backing.

9. The method of perforating an adhesive tape, said tape comprising a thermoplastic film backing and a coating of a pressure-sensitive adhesive layer thereon, said adhesive layer faced with a releasable facing sheet, comprising the steps of: passing the tape into a nip between a heated smooth surface and projections having end surfaces facing said smooth surface, said tape positioned in said nip with the facing sheet in contact with said smooth surface; heating said smooth surface to a temperature at least equal to the temperature at which said backing is rendered flowable under an applied pressure; applying pressure to discrete areas of said tape corresponding to the end surfaces of said projections by compressing the tape at the nip between said smooth surface and said end surfaces; rendering the portions of said adhesive layer and backing flowable at said discrete areas by conductance of heat thereto from said smooth surface; and displacing said portions of the adhesive layer and backing radially from said discrete areas by continuing the application of pressure thereto to form perforations in said adhesive layer and said backing.

10. The method of claim 8 wherein said tape is interposed between said facing sheet in contact with the adhesive layer and a flexible back-up sheet against said film backing while being subjected to heat and pressure.

11. The method of claim 9 wherein said tape is interposed between said facing sheet in contact with the adhesive layer and a flexible back-up sheet against said film backing while being subjected to heat and pressure.

12. The method of perforating an adhesive tape, said tape comprising a thermoplastic film backing and a coating of a pressure-sensitive adhesive layer thereon, said adhesive layer faced with a releasable facing sheet, comprising the steps of: passing the tape into a nip between a smooth surface and heated projections having end surfaces facing said smooth surface, said tape positioned in said nip with the facing sheet in contact with said end surfaces; heating said projections to a temperature at least equal to the temperature at which said backing is rendered flowable under an applied pressure; applying pressure to discrete areas of said tape corresponding to the end surfaces of said projections by compressing the tape at the nip between said smooth surface and said end surfaces; rendering the portions of said adhesive layer and backing flowable at said discrete areas by conductance of heat thereto from said end surfaces; and displacing said portions of said adhesive layer and backing radially from said discrete areas by continuing the application of pressure thereto to form perforations in said adhesive layer and said backing.

13. An apparatus for perforating pressure-sensitive adhesive tape comprising: a rotatable first roll and a rotatable pattern roll positioned to form a nip therebetween for compression and passage of pressure-sensitive adhesive tape therethrough, said first roll having a smooth circumferential surface, said pattern roll having a plurality of bosses thereon isolated from each other by depressed areas of said roll around each of said bosses the end surfaces of which form discontinuous isolated nips with the smooth surface of said first roll at a temperature higher than the temperature of the end surfaces of the bosses; driving means for rotating said pattern roll; and a release sheet positioned between said first roll and said pattern roll for passage therebetween with said adhesive tape providing a surface against which discrete areas of the adhesive under compression at said isolated nips are displaced radially from said nips to provide discrete openings therein.

References Cited by the Examiner
UNITED STATES PATENTS

| | | | |
|---|---|---|---|
| 1,921,456 | 8/33 | Delaney | 18—10 |
| 2,582,294 | 1/52 | Stober | 18—10 XR |
| 2,689,379 | 9/54 | Nissel. | |
| 2,704,049 | 3/55 | Vogt | 83—346 |
| 2,817,596 | 12/57 | Schur | 117—4 |
| 2,822,286 | 2/58 | Vogt | 117—4 |
| 2,928,124 | 3/60 | Hugger | 18—10 |

FOREIGN PATENTS

| | | |
|---|---|---|
| 1,079,767 | 4/60 | Germany. |
| 876,086 | 8/61 | Great Britain. |

ROBERT F. WHITE, *Primary Examiner.*

MICHAEL V. BRINDISI, ALEXANDER H. BRODMERKEL, *Examiners.*